United States Patent [19]
Rebers

[11] Patent Number: 4,722,677
[45] Date of Patent: Feb. 2, 1988

[54] DEVICE FOR THE MOULDING AND DIRECT ATTACHMENT OF SOLES TO SHOE SHAFTS

[75] Inventor: Günter Rebers, Achim, Fed. Rep. of Germany

[73] Assignee: Klöckner-Ferromatik Desma GmbH, Malterdingen, Fed. Rep. of Germany

[21] Appl. No.: 860,005

[22] Filed: May 5, 1986

[30] Foreign Application Priority Data

May 8, 1985 [DE] Fed. Rep. of Germany ....... 3516510

[51] Int. Cl.$^4$ .............................................. B29C 45/16
[52] U.S. Cl. .................................... 425/119; 264/244; 425/129 S; 425/588
[58] Field of Search ....................... 12/142 RS, 142 T; 264/244; 425/119, 129 R, 129 S, 183, 182, 192 R, 130, 588

[56] References Cited

U.S. PATENT DOCUMENTS

| | | | |
|---|---|---|---|
| 3,045,282 | 7/1962 | Heideman | 425/119 |
| 3,671,621 | 6/1972 | Fukuoka | 425/119 |
| 3,751,200 | 8/1973 | Borisuck et al. | 425/129 S |
| 3,915,608 | 10/1975 | Hujik | 425/129 S |
| 3,924,995 | 12/1975 | Crooks et al. | 425/129 S |
| 4,043,725 | 8/1977 | Schmidt | 425/129 R |
| 4,090,831 | 5/1978 | Hujik | 425/129 S |
| 4,302,416 | 11/1981 | Rudolf et al. | 425/119 |

FOREIGN PATENT DOCUMENTS 877454 9/1961 United Kingdom ............ 425/129 S

Primary Examiner—Jay H. Woo
Assistant Examiner—J. Fortenberry
Attorney, Agent, or Firm—Watson, cole, Grindle & Watson

[57] ABSTRACT

A device for moulding soles composed of a rubber tread and a polyurethane intermediate layer and for directly attaching the soles to shoe shafts includes a bottom work station in which the rubber tread is moulded, a top moulding station in which the polyurethane intermediate layer is moulded between the rubber tread and a shoe shaft, and an intermediate cooling station wherein the rubber tread is cooled prior to being transported to the top moulding station.

13 Claims, 4 Drawing Figures

DEVICE FOR THE MOULDING AND DIRECT ATTACHMENT OF SOLES TO SHOE SHAFTS

BACKGROUND OF THE INVENTION

1. Field of the Invention

The present invention relates to devices which directly apply soles composed of rubber treads and polyurethane intermediate layers to shoe shafts in the manufacture of footwear.

2. The Prior Art

It is known to make footwear by first casting a tread of rubber in a first injection moulding machine, then inserting this tread into the moulding station of a second moulding machine, i.e., so as to leave a hollow area between the rubber tread and a shoe shaft, and then injecting polyurethane into the hollow area to provide an intermediate sole (layer) between the rubber tread and the shoe shaft. However, this manufacturing technique has the disadvantage that the two portions of the sole (the rubber tread and the polyurethane intermediate layer) are produced in two separate production procedures, such that not only are two machines needed, but additional operating personnel are needed as well. As such, this manufacturing technique involves a considerable investment in time and money.

SUMMARY OF THE INVENTION

The object of the present invention is to provide a single device in which the rubber tread of the sole is first moulded and vulcanized, then cooled, and in which the intermediate layer of polyurethane can thereafter be moulded between the tread and a shoe shaft.

In the preferred embodiment of the invention the device includes individual work stations which are arranged in levels above one another, whereby the production procedure occurs from the bottom to the top. At the bottom is the actual moulding station for the rubber tread; in the center, the transfer and cooling station for the rubber tread; and on top the injection station for the polyurethane intermediate layer. One part of the moulding station for the rubber tread interacts with the cooling station and the cooling station with the injection station for the intermediate layer.

The invention has the advantage that the direct application to the shoe shaft of a thin intermediate layer of polyurethane and a wear resistant rubber tread is done in a single machine, in spite of the fact that the rubber has to be heated for vulcanization and has to be cooled again for combination with the polyurethane, and in spite of the fact that theses materials do not adhere together very well. The invention provides, on the one hand, a saving in personnel, and, on the other hand, a considerable saving in costs because it is not necessary to use two moulding machines in the fabrication process. Another important advantage resides in the fact that the actual sole application with the two different materials can be done in a relatively short cycle. By a special treatment of the rubber tread contact surface, it is also possible to improve the adhesive qualities. Using the inventive devices, the only manual work remaining is the fitting of the shafts onto the lasts. The combination of the various work phases in a single device provides a particularly successful combination, both from an engineering and an economic point of view.

The invention will now be better understood by reference to the attached drawings taken in conjunction with the following discussion.

DETAILED DESCRIPTION OF THE PREFERRED EMBODIMENT

Figure 1:
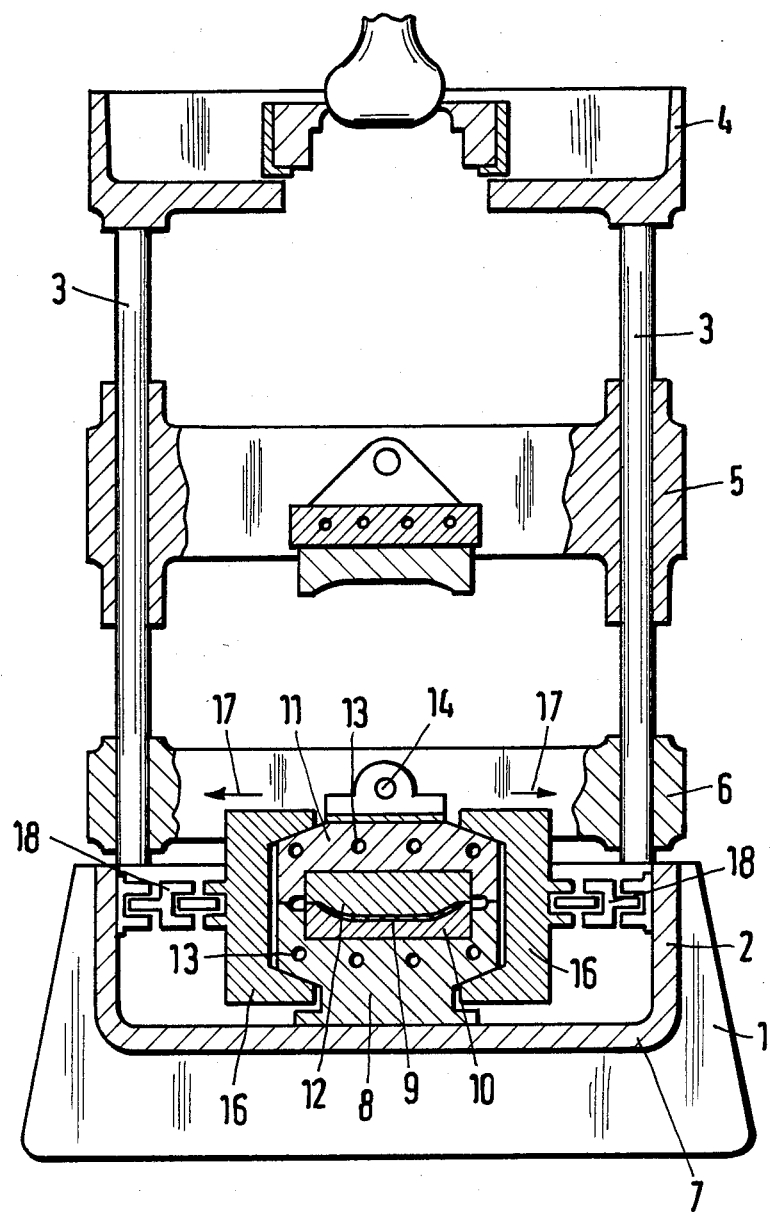
FIG. 1 shows a cross-sectional view of a device according to a preferred embodiment of the present invention when in the moulding position for the rubber tread.

A preferred embodiment of the inventive device is shown in FIGS. 1-4. It includes a base frame 1 and a plurality of guide elements (rods) 3 extending upwardly therefrom. Extending between these guide elements 3 are transverse carrier elements 4, 5 and 6, transverse carrier 4 being fixed in position and transverse carrier element 5 and 6 being movable up and down along the guide elements 3.

The frame 1 provides a floor 7 and side walls 2, and supported on bottom 7 is a bottom ram 8. Inserted in the bottom ram 8 is a die cavity 10. In a top ram 11 is positioned a top flask 12 for the production of the tread 9. The bottom ram 8 and the top ram 11 include channels 13 for a heated fluid because the moulding cavity must be heated in order to mould the rubber tread.

The top ram 11 is rotatably attached to the transverse carrier element 6 at joint 14 such that it can be rotated by 180° around the joint 14.

Mounted on the side walls 2 are lateral clamps 16 which are capable of holding the bottom ram 8 and the top ram 11 together. The two clamps 16 can be moved to the right or to the left, i.e., in the directions of the arrows 17, to the extent that the top ram 11 can be moved out of the clamped position as soon as the two clamps are opened. The clamps 16 can be moved laterally by transport devices 18.

The transport devices 18 are activated when the injection process for the production of the rubber tread 9 is completed and it is to be removed from its mould. For this purpose, the two clamps are moved away from the rams 8 and 11 and the top ram 11 is then moved upwardly (by movement of transverse carrier elements 6 along the guide elements 3) and rotated by 180° around joint 14. During this rotation the rubber tread 9 sticks to the top flask 12. After execution of this rotation, the rubber tread 9 is then supported on top of the rotated top flask 12.

Figure 2:
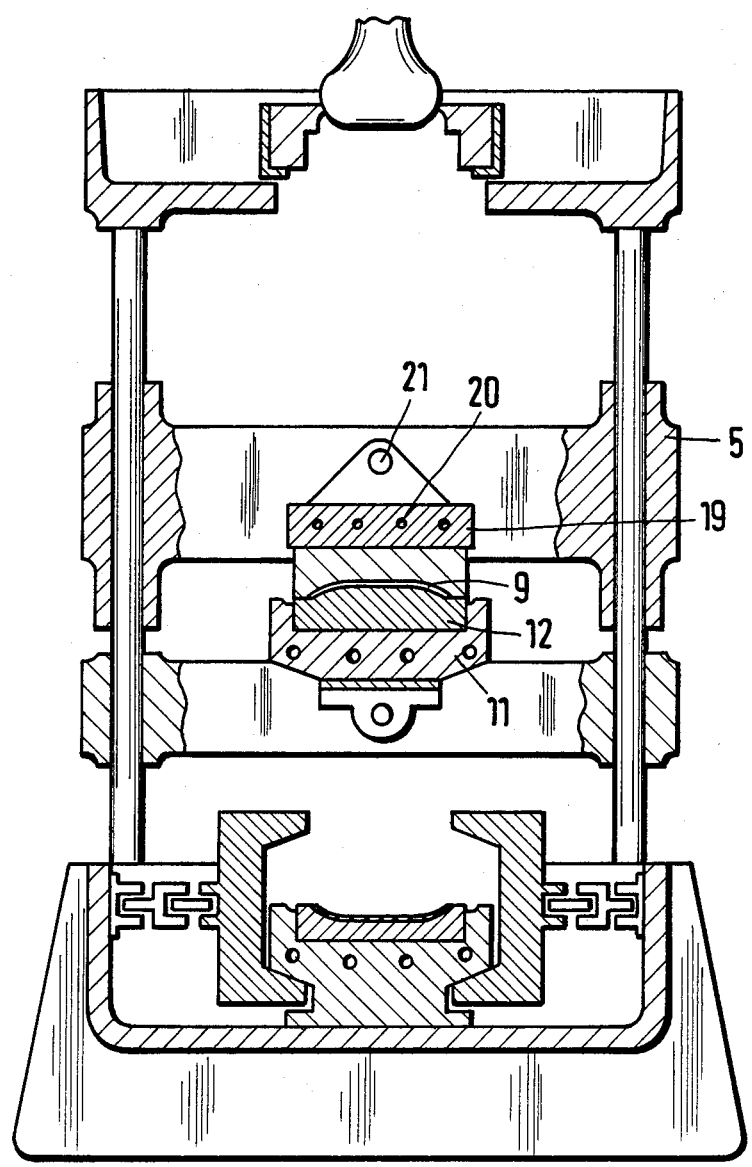
FIG. 2 shows a cross-sectional view of the device of FIG. 1 when in the position in which the moulded rubber tread is transferred and cooled.

This repositioning of elements is shown in FIG. 2, whereby the top ram 11 with the top flask 12 and the rubber tread 9 have already reached the cooling mould 19. There, the rubber thread 9, which has been moulded and vulcanized with heat, is cooled. The cooling channels are indicated by numeral 20. The cooling mould 19 is pivotally mounted on the transverse carrier element 5 at joint 21. The cooling mould 19 can also be rotated by 180° around this joint 21 so that the cooled rubber sole 9 can be located on top of the cooling mould 19.

Figure 3:
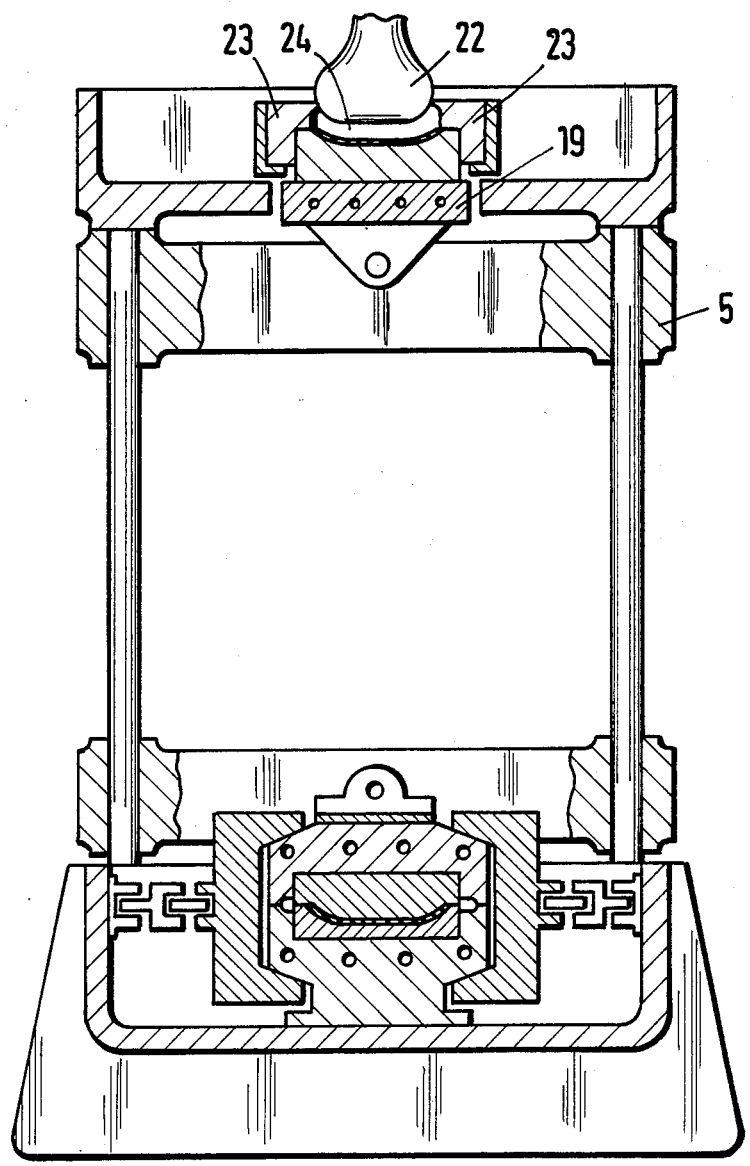
FIG. 3 shows a cross-sectional view of the device of FIG. 1 when in the position in which the intermediate sole of polyurethane is injected between the shoe shaft and the rubber tread.
Figure 4:
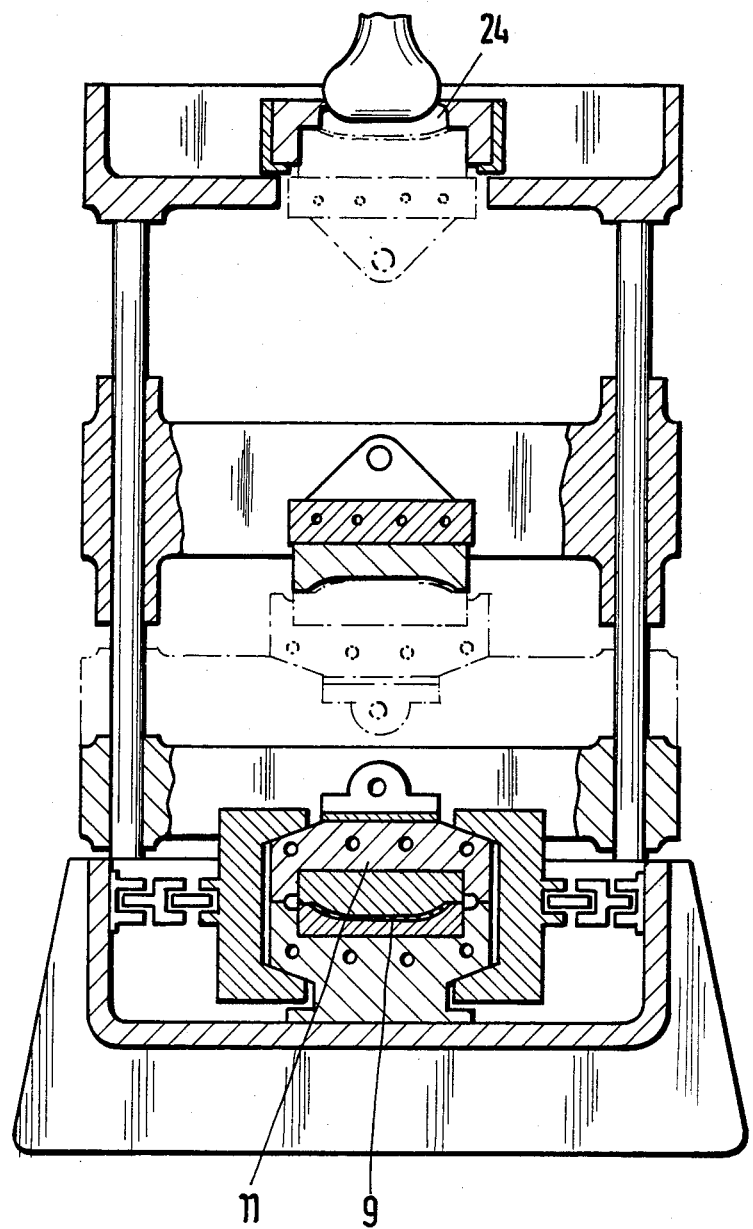
FIG. 4 is identical to FIG. 1 but shows in phantom certain elements thereof in different operational positions, i.e., as shown in FIGS. 2 and 3.

The further procedure can be seen in FIG. 3. The transverse carrier element 5 moves upwardly with the rotated cooling mould 19 such that the cooling mould 19 fits within a lower opening between two lateral mould sections 23 mounted on the transverse carrier element 4, leaving a gap between the cooled rubber tread 9 and a shoe shaft 22 extending downwardly into the upper opening between the mould sections 23. The gap is then filled via injection with polyurethane to form the intermediate layer 24. After this process the shoe with a sole made of the rubber tread 9 and the intermediate layer 24 of polyurethane is completed and can be removed from the device.

If needed, the lower mould for the rubber tread 9 can be cleaned by means of a cleaning machine (not shown) after opening and transfer of the tread.

During the transfer of the rubber tread 9 to the cooling mold it must be assured that the rubber tread adheres to the top flask 12 during rotation. However, this is easy to attain by a tight contact, e.g., by making use of undercuts.

During transfer of the rubber tread 9 to the cooling mould it is important that the rubber tread can be loosened from the top flask 12. This can be done, for example, by utilizing a suction means on the cooling mould (not shown).

It is obvious that separate injection units are needed for the rubber material as well as for the polyurethane. However, for simplicity such injection units are also not shown in the drawings.

Various modifications in the invention can be made and still fall within the scope of the appended claims. For example, the transfer of the rubber tread 9 from the lower mould to the cooling mould can also be achieved by means of an external transfer device (not shown). In this case a rotational mounting of the top ram 11 on the transverse carrier element 6 is not necessary. In addition, the transfer of the moulded rubber thread to the cooling station does not have to be done with the aid of the top flask of the moulding station, but can take place by using a separate transfer device (not shown). It is also not absolutely necessary that the cooling station be intergrated into the overall device. It is possible to provide between the moulding station for the tread and the moulding station for the intermediate layer a separate transport device which, on the one hand, removes the tread from the moulding station for the tread, passes it to a separate cooling station, if this is needed, whereby the cooling station is separate from the inventive device, and, on the other hand, transports the tread to the bottom ram of the moulding station for the intermediate layer.

I claim:

1. A device for moulding soles which include treads of rubber and intermediate layers of polyurethane and for directly attaching the moulded soles to shoe shafts, said device including
   a bottom die having a forming cavity,
   a top mould which is positioned vertically above said bottom die, said top mould having an upper opening in which a shoe shaft can be positioned and a lower opening in which a transfer die can be positioned,
   a first ram which supports a top flask,
   a second ram which supports a transfer die, said second ram including channels therein for the flow of cooling fluid therethrough,
   a first mounting means which supports said first ram and is capable of moving said first ram back and forth from a first position where said top flask supported thereon is in contact with said bottom die, thereby providing a first moulding station wherein a tread of rubber can be moulded, to a second position where said top flask is remote from said bottom die, and
   a second mounting means which supports said second ram and is capable of moving said second ram back and forth from a first position where the transfer die supported thereon is in contact with said top flask when said first ram is in its second position, thereby forming a cooling station, to a second position where said transfer die fits within said lower opening in said top mould, thereby providing a second moulding station where a layer of polyurethane can be formed between said tread of rubber and a shoe shaft that extends into the upper opening of said top mould.

2. The device of claim 1, wherein said first ram includes channels therein for the passage of a heating fluid therethrough.

3. The device of claim 1, including a fourth ram which supports said bottom die, and wherein said fourth ram includes channels therethrough for the passage of a heating fluid therethrough.

4. The device of claim 1, wherein first mounting means is movable between said bottom die and said second mounting means, and wherein said second mounting means is movable between said first mounting means and said top mould.

5. The device of claim 4, wherein said first ram is rotatably attached to said first mounting means.

6. The device of claim 5, wherein said second ram is rotatably attached to said second mounting means.

7. The device of claim 6, including clamps which are horizontally movable toward and away from each other to either clamp said top flask and said bottom die together when said top flask is in its first position or allow said top flask to be positioned away from said bottom die.

8. The device of claim 6, including a bottom frame supporting said fourth cam.

9. The device of claim 8, including a third mounting means which support said top mould.

10. The device of claim 9, including guide means extending between said bottom frame and said third mounting means.

11. The device of claim 10, wherein said guide means comprises a plurality of parallel guide rods.

12. The device of claim 11, wherein said first and second mounting means comprise transverse platform elements which are movable along said parallel guide rods.

13. The device of claim 1, wherein said top mould comprises two lateral sections.

* * * * *